(12) United States Patent
Zhang

(10) Patent No.: US 10,489,626 B2
(45) Date of Patent: Nov. 26, 2019

(54) FINGERPRINT MODULE, METHOD FOR FABRICATING THE SAME, AND MOBILE TERMINAL HAVING THE SAME

(71) Applicant: GUANGDONG OPPO MOBILE TELECOMMUNICATIONS CORP., LTD., Dongguan, Guangdong (CN)

(72) Inventor: Wenzhen Zhang, Dongguan (CN)

(73) Assignee: Guangdong Oppo Mobile Telecommunications Corp., Ltd., Dongguan (CN)

(*) Notice: Subject to any disclaimer, the term of this patent is extended or adjusted under 35 U.S.C. 154(b) by 64 days.

(21) Appl. No.: 15/674,784

(22) Filed: Aug. 11, 2017

(65) Prior Publication Data

US 2018/0053030 A1    Feb. 22, 2018

(30) Foreign Application Priority Data

Aug. 16, 2016 (CN) .......................... 2016 1 0679971

(51) Int. Cl.
*G06K 9/00* (2006.01)
*H04M 1/02* (2006.01)
*G06F 1/16* (2006.01)

(52) U.S. Cl.
CPC ......... *G06K 9/0002* (2013.01); *G06F 1/1696* (2013.01); *G06K 9/00067* (2013.01); *G06K 9/00087* (2013.01); *H04M 1/026* (2013.01); *G06K 9/00053* (2013.01); *H04M 2250/12* (2013.01)

(58) Field of Classification Search
CPC ................. G06K 9/00; G06K 19/0718; G06K 19/07354; G06F 21/32; G06F 17/3074; G06F 17/30784
See application file for complete search history.

(56) References Cited

U.S. PATENT DOCUMENTS

2006/0034499 A1* 2/2006 Shinoda ............. G06K 9/00013
                                                          382/124
2008/0238878 A1 10/2008 Wang
2009/0021487 A1  1/2009 Tien
(Continued)

FOREIGN PATENT DOCUMENTS

CN        104779221 A      7/2015
CN        204631894 U      9/2015
(Continued)

OTHER PUBLICATIONS

Quan Jiang, Flat panel display driving technology, Aug. 31, 2014, p. 65-66, National Defense Industry Press, 7 Pages.

*Primary Examiner* — Bobbak Safaipour
(74) *Attorney, Agent, or Firm* — Young Basile Hanlon & MacFarlane, P.C.

(57) ABSTRACT

A fingerprint module, a method for fabricating the same, and a mobile terminal having the same are provided. The fingerprint module has a cover plate and a fingerprint chip. The cover plate has an inner surface. The fingerprint chip is heat-pressed on the inner surface by adhesive, such that the adhesive fully contacts the cover plate and the fingerprint chip. The method includes after heating the adhesive which is coated on the inner surface of the cover plate, the fingerprint chip is laminated on the adhesive, such that the adhesive fully contacts the cover plate and the fingerprint chip.

17 Claims, 9 Drawing Sheets

(56) References Cited

U.S. PATENT DOCUMENTS

| | | | | |
|---|---|---|---|---|
| 2009/0184408 A1* | 7/2009 | Okada | ............... | G06K 9/0002 |
| | | | | 257/680 |
| 2016/0004899 A1 | 1/2016 | Pi | | |
| 2016/0171271 A1 | 6/2016 | Lundahl | | |
| 2017/0004343 A1 | 1/2017 | Xie et al. | | |
| 2017/0235398 A1* | 8/2017 | Choi | ............... | G06F 3/0416 |
| | | | | 345/173 |
| 2018/0049674 A1* | 2/2018 | Zhang | ............... | A61B 5/117 |
| 2018/0052554 A1* | 2/2018 | Zhang | ............... | G06F 3/0412 |
| 2018/0053030 A1 | 2/2018 | Zhang | | |
| 2018/0053037 A1* | 2/2018 | Zhang | ............... | A61B 5/117 |
| 2018/0054896 A1* | 2/2018 | Zhang | ............... | G06K 9/00006 |
| 2018/0060645 A1* | 3/2018 | Zhang | ............... | G06K 9/40 |

FOREIGN PATENT DOCUMENTS

| | | |
|---|---|---|
| CN | 105404880 A | 3/2016 |
| CN | 105528104 A | 4/2016 |
| CN | 105551985 A | 5/2016 |
| CN | 105630237 A | 6/2016 |
| CN | 205302318 U | 6/2016 |
| CN | 105844219 A | 8/2016 |
| CN | 106295590 A | 1/2017 |

* cited by examiner

FINGERPRINT MODULE, METHOD FOR FABRICATING THE SAME, AND MOBILE TERMINAL HAVING THE SAME

CROSS REFERENCE TO RELATED APPLICATION

This application is a non-provisional patent application, which claims priority to Chinese Application No. 201610679971.2, filed on Aug. 16, 2016. The entire disclosure of the above application is incorporated herein by reference.

FIELD OF THE DISCLOSURE

The present disclosure relates to electronic equipment, and more particularly to a fingerprint module, a method for fabricating the same, and a mobile terminal having the fingerprint module.

BACKGROUND OF THE DISCLOSURE

With fingerprint identification being more and more widely used in mobile phones, there are more and more stringent demands on quality of fingerprint modules. Typically, each of the fingerprint modules includes a fingerprint chip fixed onto a cover plate. However, due to relatively light weight nature of the fingerprint chip, the fingerprint chip becomes easily detached from the cover plate by other components when being fixed to the cover plate, which leads to defectiveness of the fingerprint module and causes poor production quality.

DESCRIPTION OF THE DRAWINGS

In order to more clearly describe embodiments of the present disclosure or technical solutions in a conventional technology, drawings required to be used for the embodiments or descriptions of the conventional technology are simply described hereinafter. Apparently, the drawings described below only illustrate some embodiments of the present disclosure. Those skilled in the art can obtain other drawings based on these drawings disclosed herein without creative effort.

DETAILED DESCRIPTION OF THE PREFERRED EMBODIMENTS

The technical solutions in the embodiments of the present disclosure will be described in the following with reference to the accompanying drawings in the embodiments of the present disclosure in a clear and complete manner. Apparently, the described embodiments are merely part of the present disclosure, and are not all embodiments. All other embodiments obtained by those of ordinary skill in the art without making creative work are within the scope of the present disclosure, based on the embodiments in the present disclosure.

Figure 1:
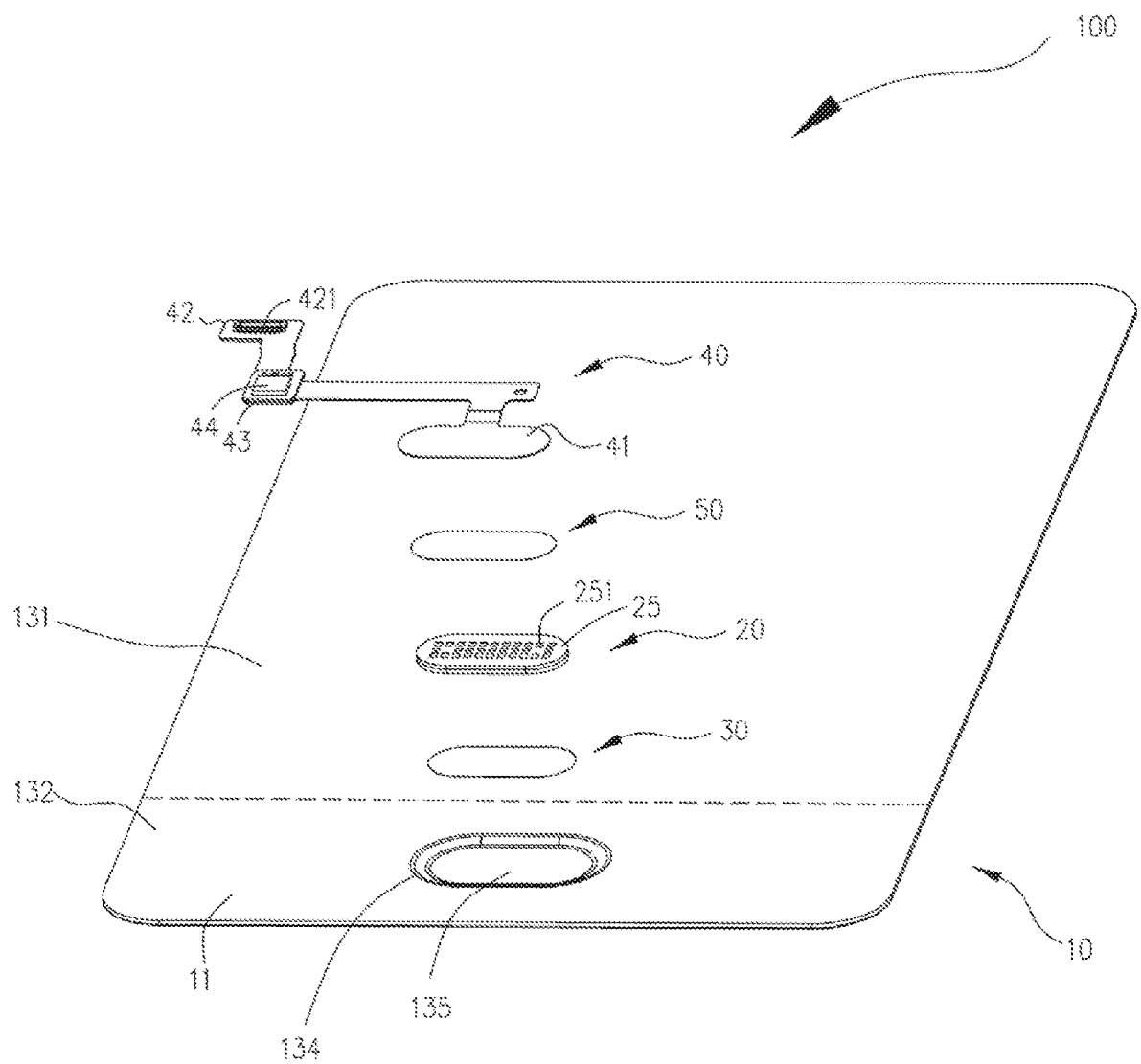
FIG. 1 is an exploded schematic diagram showing a fingerprint module according to a first embodiment of the present disclosure.
Figure 2:
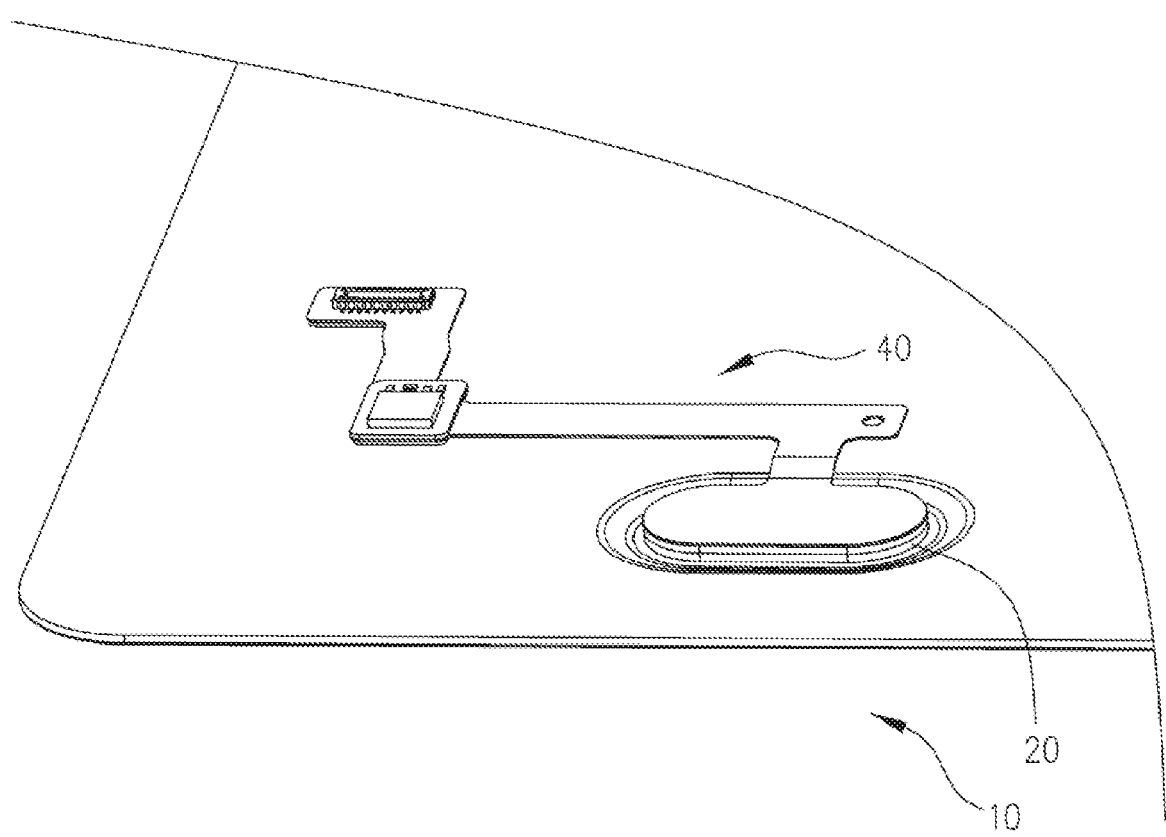
FIG. 2 is an assembled schematic diagram of the fingerprint module in FIG. 1.
Figure 3:
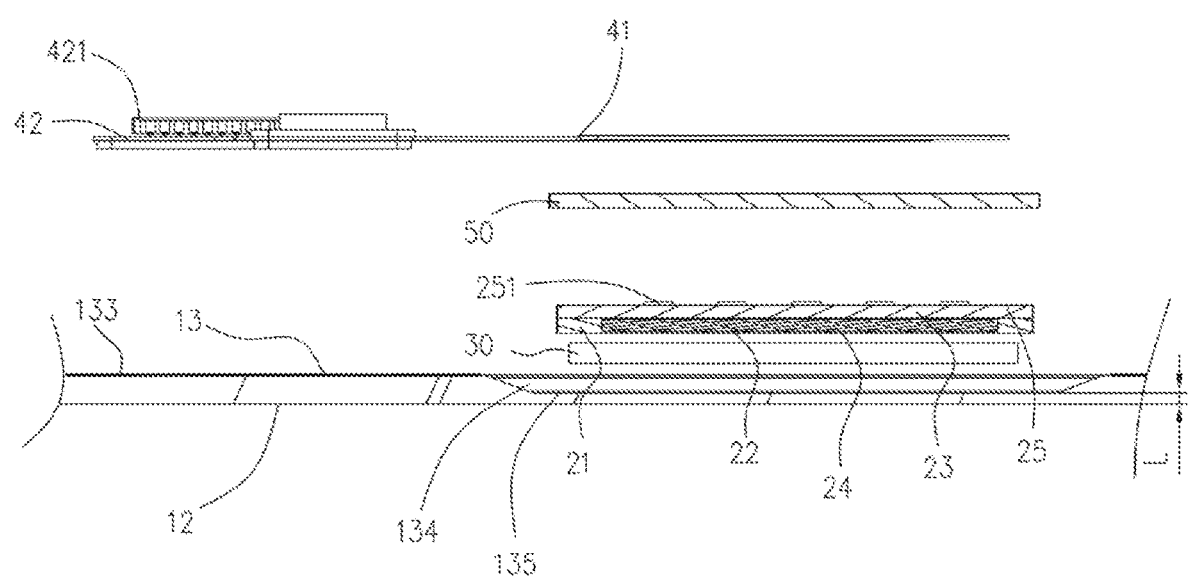
FIG. 3 is a cross-sectional schematic diagram of the fingerprint module in FIG. 1.
Figure 8:
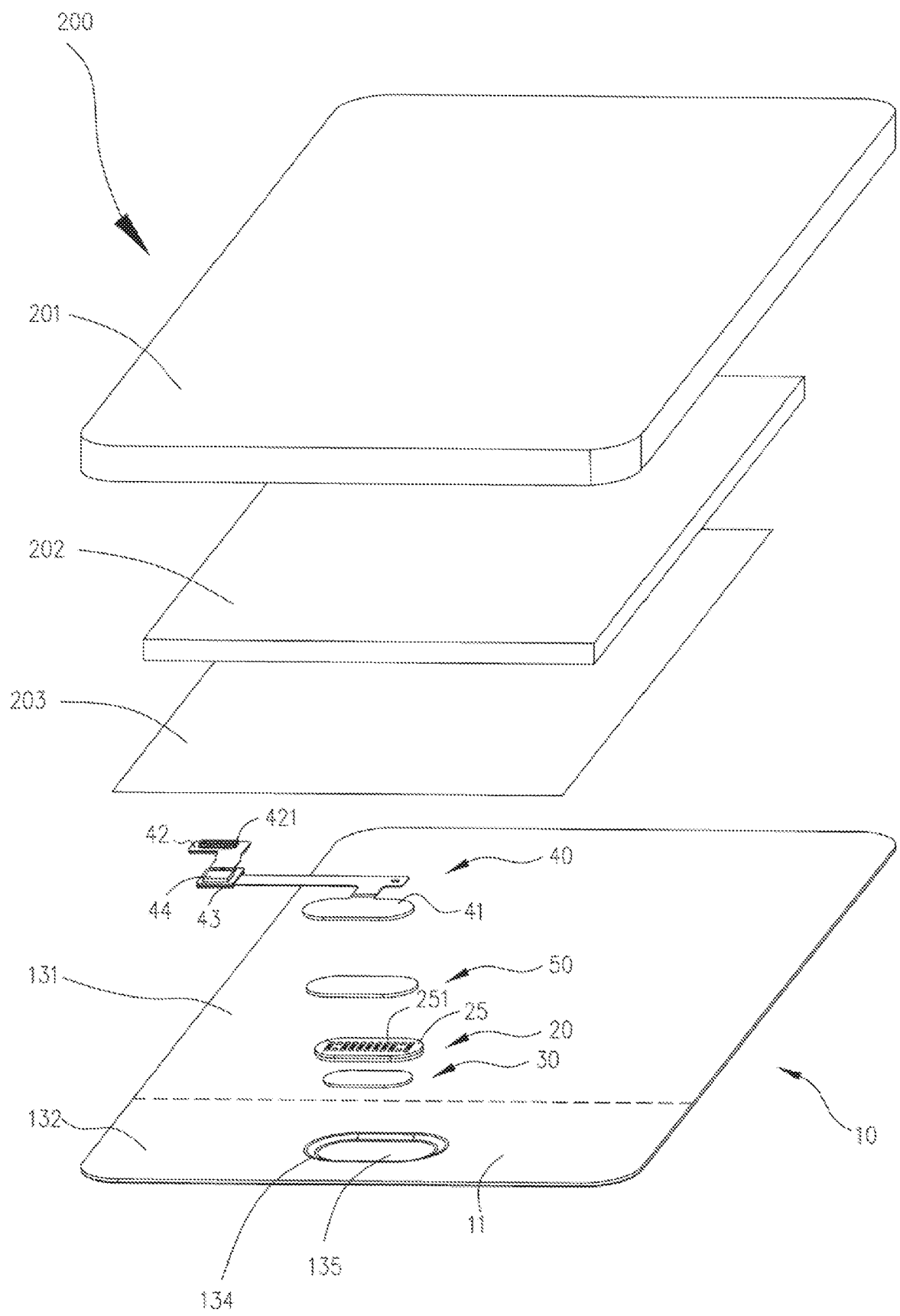
FIG. 8 is a schematic diagram showing a mobile terminal according to the present disclosure.

Please refer to FIG. 1 to FIG. 3. In one embodiment, the present disclosure provides a mobile terminal 200 (as shown in FIG. 8). The mobile terminal 200 includes a terminal body 201 (as shown in FIG. 8), a motherboard (as shown in FIG. 8), and a fingerprint module 100 fixed onto the terminal body 201 and electrically coupled to the motherboard 202. The fingerprint module 100 is used to receive a user fingerprint information and deliver the user fingerprint information to the motherboard 202. The motherboard 202 is used to control the mobile terminal 200 to run according to the user fingerprint information.

The mobile terminal can be a mobile phone, a computer, a tablet, a handheld game console or a media player and other smart mobile terminals. In the present embodiment, the mobile phone is used as an example for illustration.

As shown in FIG. 1 to FIG. 3, the fingerprint module 100 includes a cover plate 10 and a fingerprint chip 20. The cover plate 10 includes an inner surface 11. The fingerprint chip 20 is heat-pressed on the inner surface 11 by adhesive 30, such that the adhesive 30 fully contacts the cover plate 10 and the fingerprint chip 20.

After heating the adhesive 30, which is coated on the inner surface 11 of the cover plate 10, the fingerprint chip 20 is laminated on the adhesive 30, such that the adhesive 30 fully contacts the cover plate 10 and the fingerprint chip 20. Therefore, the fingerprint chip 20 is tightly combined with and is difficult to detached from the cover plate 10, and improving quality of the fingerprint module 100.

The cover plate 10 can be a mobile phone front cover or a mobile phone back cover. A first embodiment is provided, and the mobile phone front cover is used as an example for illustration. Specifically, the cover plate 10 is used to cover with a display screen 203 of the mobile terminal 200. The cover plate 10 includes an outer surface 12 and an inner surface 11 disposed with respect to the outer surface 12. The outer surface 12 faces a user, and the inner surface 11 is used to fit the motherboard 203. The inner surface 11 includes a light-transmitting region 131 and a shading region 132 adjacent to a bottom end of the light-transmitting region 131. Light emitted by the display screen 203 (shown in FIG. 8) passes through the light-transmitting region 131. An ink layer 133 is coated on the shading region 132 and is used to shield light emitted by display screen 203 from passing through a non-display region, thereby preventing the display screen 203 from leaking. The fingerprint chip 20 is located at the shading region 132 to facilitate the user to touch a place of the outer surface 12 corresponding to the fingerprint chip 20. More specifically, a groove 134 is defined in the shading region 132 of the inner surface 11. The groove 134 includes a bottom surface 135 near the outer surface 12. The fingerprint chip 20 is fit onto the bottom surface 135.

Therefore, a distance between the fingerprint chip 20 and the outer surface 12 is decreased, so as to enable the user to touch a location of the outer surface 12 corresponding to the groove 134. The fingerprint chip 20 can receive the user fingerprint information. A distance from the bottom surface 135 to the outer surface 12 is less than or equal to 0.3 mm. By hiding the fingerprint chip 20 on an inner side of the cover plate 10, the fingerprint module 100 is waterproofed, and can improve appearance of the mobile terminal 200. Further, an entire thickness of the mobile terminal 200 can be decreased effectively. Of course, in other embodiments, by enhancing the signal reception performance of the fingerprint chip 20, the fingerprint chip 20 can be directly bonded to the inner surface 11, thereby reducing production cost of the cover plate 10.

In the present embodiment, the fingerprint chip 20 is an elliptical plate. A profile of the fingerprint chip 20 is consisting of two semicircles and a rectangle. The fingerprint chip 20 includes an encapsulation layer 21, a chip 22, and a substrate 23. The chip 22 is fixed onto the substrate 23, and the encapsulation layer 21 is laminated on the substrate 23 and covered with the chip 22. Specifically, the fingerprint chip 20 includes an identifying surface 24 disposed on the encapsulation layer 21, and a connecting surface 25 disposed on the substrate 23. It is to be understood that the identifying surface 24 faces the user, and the identifying surface 24 is attached to the bottom surface 135 by the adhesive 30. The identifying surface 24 receives the user fingerprint information through the cover plate 10. The connecting surface 25 faces away from the user. A solder pad 251 may be disposed on the connecting surface 25 so as to facilitate the fingerprint chip 20 to be electrically coupled to the motherboard 203 by using the solder pad 251. In other embodiments, the fingerprint chip 20 may also be a circular plate in shape.

In the present embodiment, the adhesive 30 is a polyurethane adhesive. The adhesive 30 is hot-fused in a high-temperature heating state so that a self-molecular force of the adhesive 30 is reduced to facilitate the adhesive 30 to absorb forces from outside. The heated adhesive 30 is coated onto the inner surface 11, and the identifying surface 24 of the fingerprint chip 20 is fit onto the adhesive 30, and then the fingerprint chip 20 is laminated, such that the adhesive 30 receives a laminating force. Under the laminating force, self-molecules of the adhesive 30 are pressed against each other to absorb the force so that the chemical bond of the adhesive 30 molecular chain is more secure. That is, an internal stress of the adhesive 30 is increased so that the adhesive 30 stably bonds the cover plate 10 and the fingerprint chip 20. The fingerprint chip 20 is not easily detached from the cover plate 10.

Further, the fingerprint module 100 further includes a circuit board 40 fixed to a side of the fingerprint chip 20 opposite to the cover plate 10, where the circuit board 40 is electrically coupled to the fingerprint chip 20.

The circuit board 40 is provided with a circuit electrically coupled to the fingerprint chip 20. One end of the circuit board 40 is electrically coupled to the fingerprint chip 20 and the other end is electrically coupled to the motherboard 202 of the mobile terminal 200. Since the fingerprint chip 20 is located at a bottom end of the mobile terminal 200 and the motherboard 202 is typically located at the middle of the mobile terminal 200, one end connected to the circuit board 40 is offset relative to the fingerprint chip 20. Therefore, center of gravity of the circuit board 40 is generally offset with respect to the fingerprint chip 20. In general, a length of the circuit board 40 is relatively long and weight of the circuit board 40 is heavier than the fingerprint chip 20, so that the circuit board 40 is affected by its own gravity and has a certain traction force to the fingerprint chip 20. Since the fingerprint chip 20 is adhered by the adhesive 30 and the fingerprint chip 20 has an adhering force to the cover plate 10, the effect of the circuit board 40 on the fingerprint chip 20 is reduced. Therefore, the length of the circuit board 40 can be increased, and other electronic components can be disposed on the circuit board 40 to improve the using efficiency of the circuit board 40 and improve a fitting ability of the fingerprint module 100. One end of the circuit board 40 away from the fingerprint chip 20 can be connected to any position of the motherboard 202, and the circuit board 40 can be in any configuration in the mobile terminal 200.

In the first embodiment, the circuit board 40 is a flexible circuit board. The circuit board 40 can be bent according to requirements. Specifically, the circuit board 40 includes a first end 41 and a second end 42 disposed with respect to the first end 41. A connector 421 is disposed on the second end 42 and can be inserted and connected to the motherboard 202, thereby facilitating a detachable connection of the fingerprint module 100 with the motherboard 202, facilitating to maintain the fingerprint module 100, and facilitating an increase in the fitting ability of the fingerprint module 100. A reinforcement layer 43 and an electronic element 44 laminated on the reinforcement layer 43 can be further disposed between the first end 41 and the second end 42 of the circuit board 40. The reinforcement layer 43 can be steel, and the electronic element 44 can be a capacitor, a resistor, a diode, or the like. By disposing the reinforcing layer 43 and the electronic element 44 between the first end 41 and the second end 42, an electrical signal processing performance of the circuit board 40 is improved and electrical signals of the fingerprint chip 20 are effectively transmitted. Therefore, the circuit board 40 does not have an effect on the fingerprint chip 20 in the case of increasing its own gravity, that is, to ensure a secure combination of the fingerprint chip 20 and the cover plate 10, thereby improving the quality of the fingerprint module 100. In other embodiments, the circuit board 40 may be laminated on an adapter plate 23 after bending.

In the present embodiment, the fingerprint chip 20 is electrically coupled to the circuit board 40 by a conductive adhesive 50. Specifically, the conductive adhesive 50 is coated on the connecting surface 25 of the fingerprint chip 20 after heat-pressing the fingerprint chip 20 on the cover plate 10 by the adhesive 30. After heating the conductive adhesive 50, the first end 41 of the circuit board 40 is heat-pressed on the connecting surface 25 by the conductive adhesive. By heating and pressing the conductive adhesive 50, metal particles existing inside the conductive adhesive 50 are collapsed, and then the solder pad 251 is electrically coupled with the circuit board 40 in a direction perpendicular to the connecting surface 25, such that the circuit board 40 is electrically coupled to the fingerprint chip 20, and the circuit board 40 is securely bonded to the fingerprint chip 20.

Figure 4:
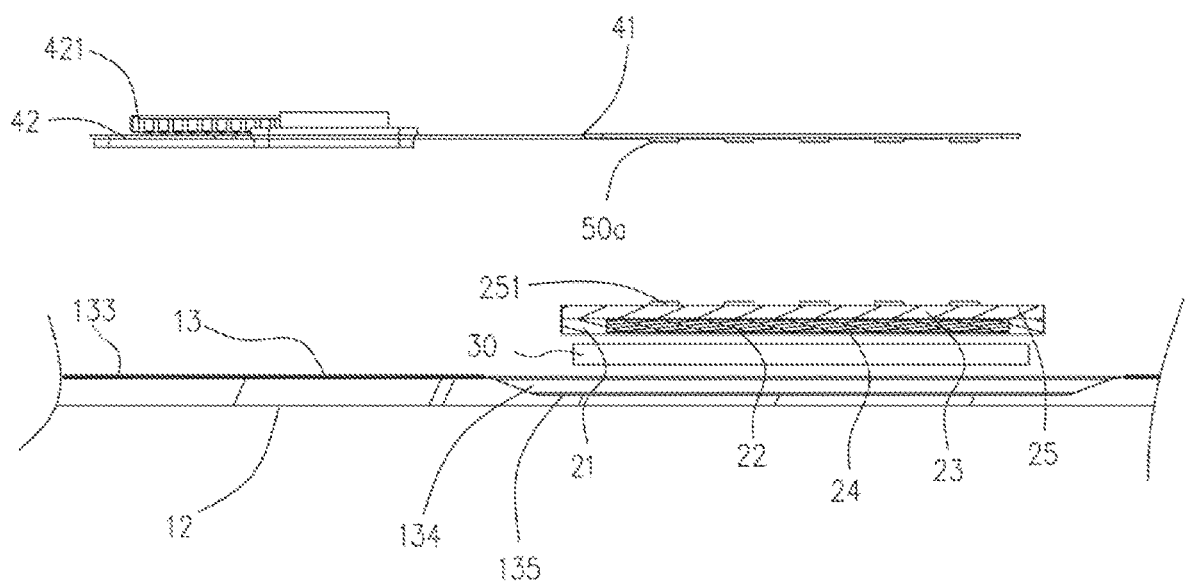
FIG. 4 is an exploded schematic diagram showing a fingerprint module according to a second embodiment of the present disclosure.

Please refer to FIG. 4. The present disclosure further provides a second embodiment substantially identical to the first embodiment. A difference is that the first end 41 of the circuit board 40 is soldered to a plurality of solder pads 251 of the fingerprint chip 20 by a solder 50a.

Figure 5:
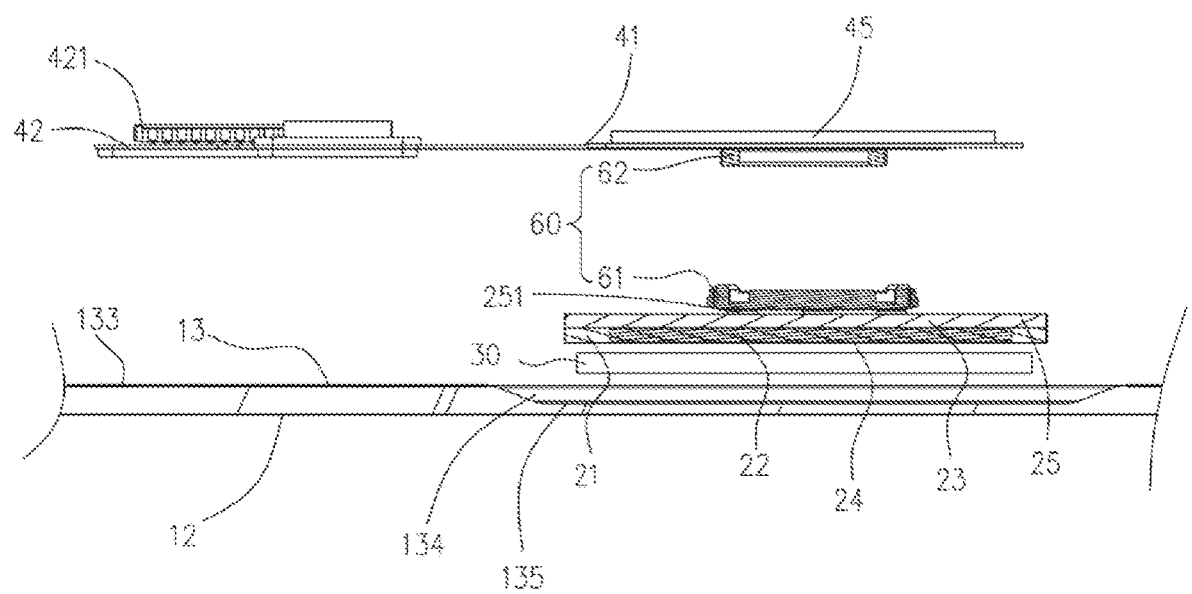
FIG. 5 is a cross-sectional schematic diagram showing a fingerprint module according to a third embodiment of the present disclosure.

Please refer to FIG. 5. The present disclosure provides a third embodiment, which the fingerprint chip 20 is electrically coupled to the circuit board 40 by a board-to-board connector 60. Specifically, the board-to-board connector 60 includes a socket 61 and a plug 62. The socket 61 is soldered onto the connecting surface 25 of the fingerprint chip 20.

The socket 61 is electrically coupled to the solder pad 251. The plug 62 is soldered onto the circuit board 40 and located at the first end 41. The circuit board 40 is located at the first end, and a reinforcement 45 is disposed on a side of the circuit board 40 opposite to the plug 42 so as to enhance a bonding strength of the plug 62 with the socket 61. By disposing the board-to-board connector 60 between the adapter plate 23 and the circuit board 40, weight of the fingerprint chip 20 is increased to enhance a pressing force of the fingerprint chip 20 to the adhesive 30, so that the fingerprint chip 20 is more secured with the cover plate 10. Further, it is convenient to connect the circuit board 40 with the fingerprint chip 20 and to disassemble and maintain the circuit board 40 and the fingerprint chip 20.

Figure 6:
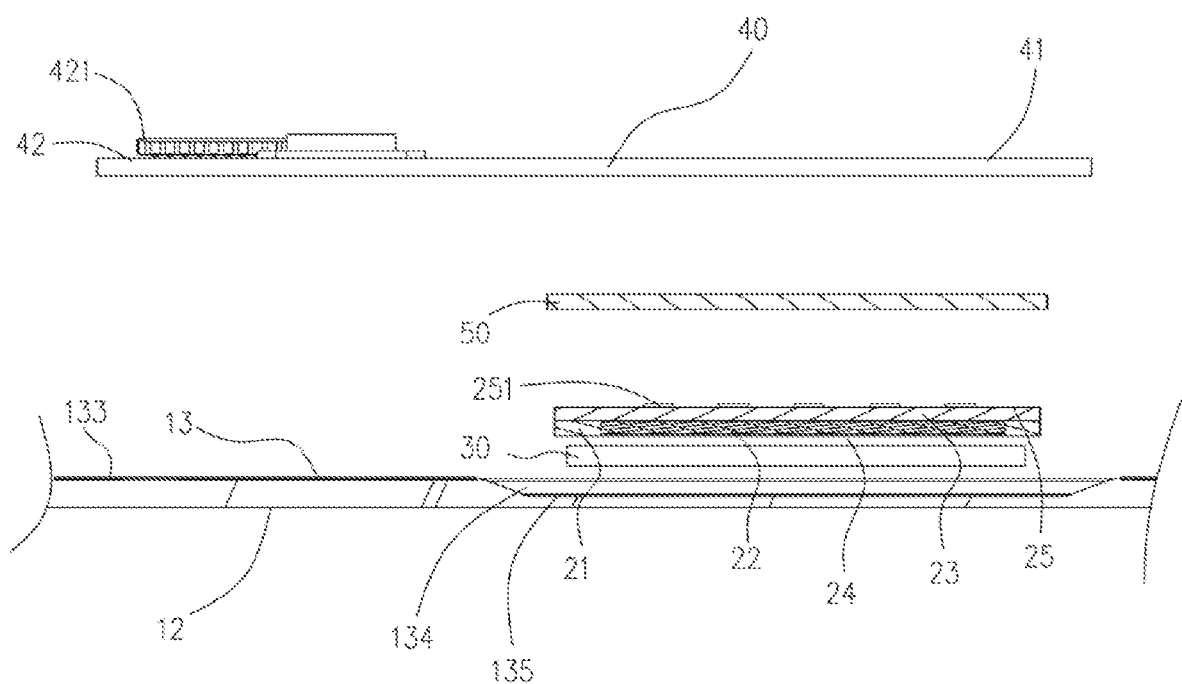
FIG. 6 is a cross-sectional schematic diagram showing a fingerprint module according to a fourth embodiment of the present disclosure.

Please refer to FIG. 6. The present disclosure further provides a fourth embodiment substantially identical to the first embodiment. A difference is that the circuit board 40 is a printed circuit board. The circuit board 40 can be a motherboard of the mobile terminal 200 and also can be a motherboard 202 independent with the mobile terminal 202, i.e., two sides of the circuit board 40 are respectively soldered to the motherboard 202 of the mobile terminal 200 and the adapter plate 23. A rigid strength of the circuit board 40 is increased so that the circuit board 40 stably loads the fingerprint chip 20, thereby increasing quality of the fingerprint module 100. Of course, in the second and third embodiments, the circuit board 40 may also be replaced with a printed circuit board.

Of course, the fingerprint module provided by the present disclosure does not exclude any simple substitutions or any combination of the above-described embodiments to form a new embodiment.

Figure 7:
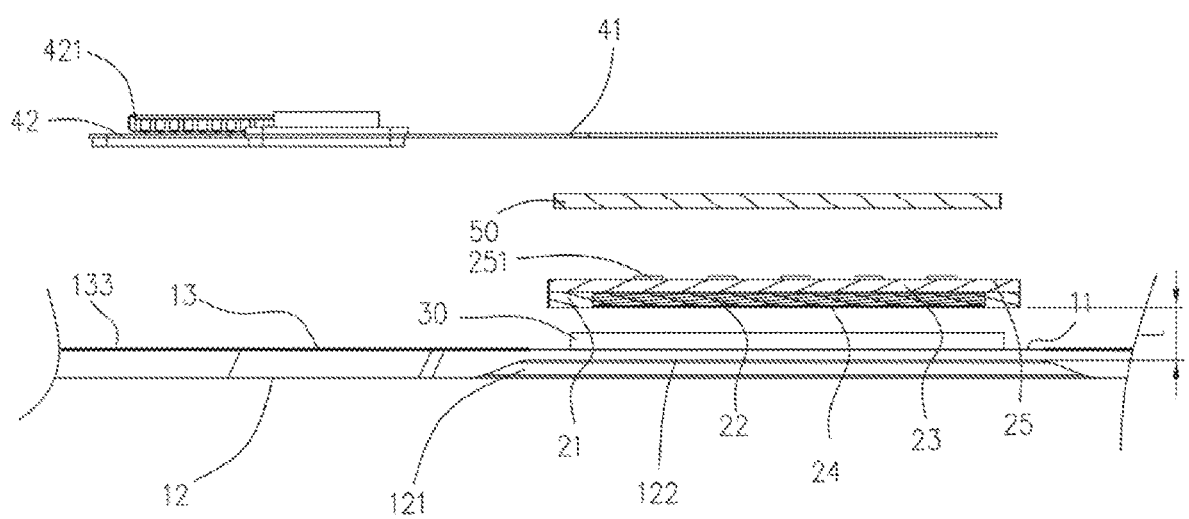
FIG. 7 is a cross-sectional schematic diagram showing a fingerprint module according to a fifth embodiment of the present disclosure.

Please refer to FIG. 7. The present disclosure further provides a fifth embodiment substantially identical to the first embodiment. One difference is that the groove 121 is defined in the outer surface 12 of the cover plate 10. The fingerprint chip 10 is located at a location of the inner surface 11 corresponding to the groove 121, i.e., the fingerprint chip 20 is fit to the location of the inner surface 11 corresponding to the groove 121. The groove 121 includes a bottom surface 122, and a distance between the bottom surface 122 and the identifying surface of the fingerprint chip 20 is less than or equal to 0.3 mm, so as to facilitate the fingerprint chip 20 to obtain the user fingerprint information via the cover plate 10 when the user touches the bottom surface 122 of the groove 121.

Figure 9:
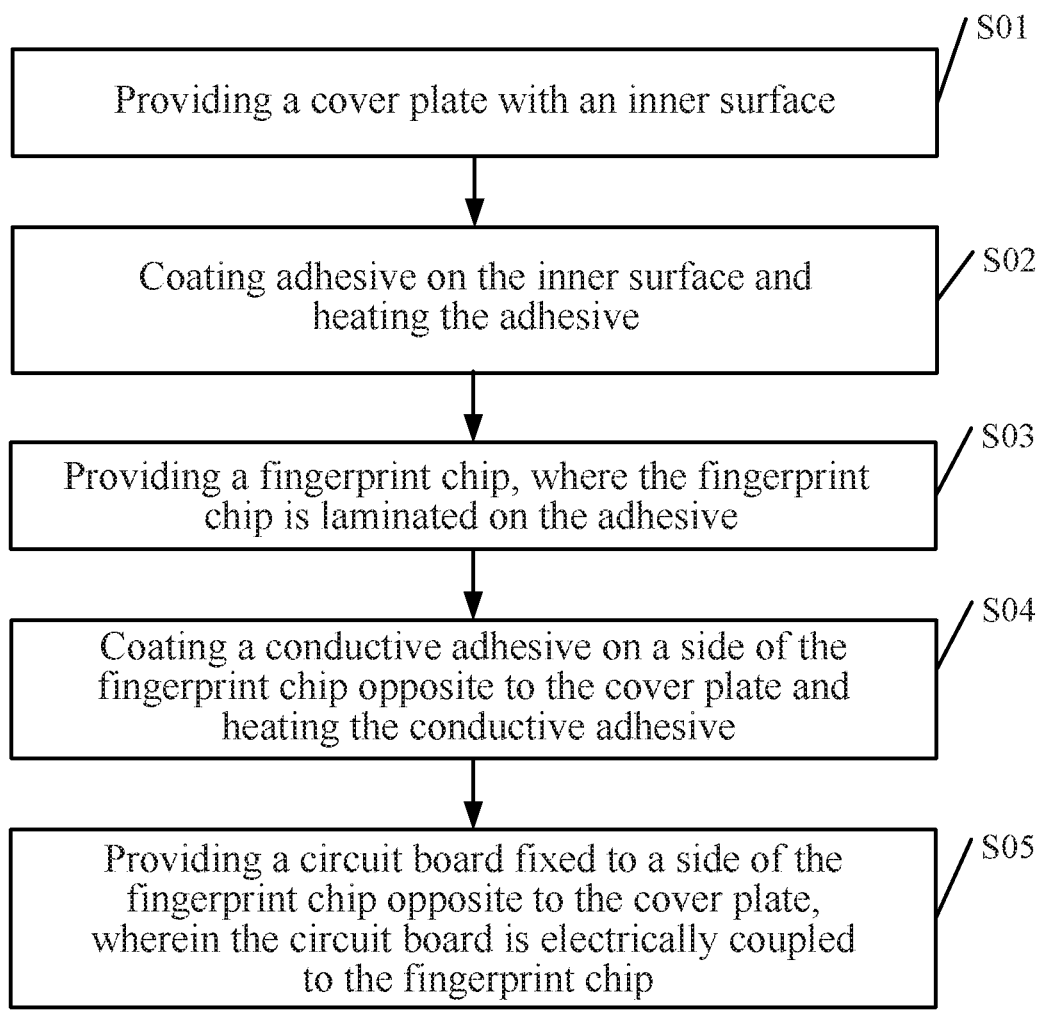
FIG. 9 is a flow chart showing a method for fabricating a fingerprint module according to the present disclosure.

Please refer to FIG. 9. The present disclosure further provides a method for fabricating a fingerprint module, which is used to fabricate the fingerprint module. The method for fabricating the fingerprint module includes:

S01: providing a cover plate 10 having an inner surface 11

In the first embodiment, the cover plate 10 is provided. The groove 134 is formed in the inner surface 11.

S02: coating adhesive 30 on the inner surface 11 and heating the adhesive 30

In the first embodiment, a polyurethane adhesive is used as the adhesive 30. The adhesive 30 is coated on the bottom surface 135 of the groove 134, and the adhesive 30 is heated at a preset temperature.

S03: providing a fingerprint chip 20, where the fingerprint chip 20 is laminated on the adhesive 30

In the first embodiment, the identifying surface 24 of the fingerprint chip 20 is attached to the adhesive 30, and the fingerprint chip 20 is laminated, such that the adhesive 30 receives a laminating force. Under the laminating force, self-molecules of the adhesive 30 are pressed against each other to absorb the force so that the chemical bond of the adhesive 30 molecular chain is more secured. That is, an internal stress of the adhesive 30 is increased so that the adhesive 30 stably bonds the cover plate 10 and the fingerprint chip 20. The fingerprint chip 20 is not easily detached from the cover plate 10.

In the second embodiment, the third embodiment and the fourth embodiment, block S01, block S02 and block S03 are carried out in the same manner as in the first embodiment, and will not be described again.

S04: coating a conductive adhesive on a side of the fingerprint chip 20 opposite to the cover plate 10 and heating the conductive adhesive 50

In the first embodiment, the conductive adhesive 50 is coated on the connecting surface 25 of the fingerprint chip 20. By heating and pressing the conductive adhesive 50, metal particles existing inside the conductive adhesive 50 are collapsed, and then the solder pad 251 is electrically coupled with the circuit board 40 in a direction perpendicular to the connecting surface 25.

S05: providing a circuit board 40 fixed to a side of the fingerprint chip 20 opposite to the cover plate 10, wherein the circuit board 40 is electrically coupled to the fingerprint chip 20

In the first embodiment, the circuit board 40 is a flexible circuit board. The circuit board 40 is laminated on the conductive adhesive 50, thereby causing the circuit board 40 to fully contact with the conductive adhesive 50, so as to ensure the circuit board 40 securely being bonded to the fingerprint chip 20 and the circuit board 40 being electrically coupled to the fingerprint chip 20.

In the second embodiment, block S04 and block S05 are performed in substantially the same manner as in the first embodiment. A difference is that the first end 41 of the circuit board 40 is soldered to a plurality of solder pads 251 of the fingerprint chip 20 by a solder 50a. The specific implementation process will be described with reference to the above-described second embodiment, and will not be described again.

In the third embodiment, block S04 and block S05 are performed in substantially the same manner as in the first embodiment. A difference is that the fingerprint chip 20 is electrically coupled to the circuit board 40 by a board-to-board connector 60. The specific implementation process will be described with reference to the above-described third embodiment, and will not be described again.

In the fourth embodiment, block S04 and block S05 are performed in the same manner as in the first embodiment, and will not be described again.

In the fifth embodiment, block S04 and block S05 are performed in the same manner as in the first embodiment. A difference is that the circuit board 40 is a printed circuit board. The specific implementation process will not be described again.

The present disclosure provides a fingerprint module, a method for fabricating the same, and a mobile terminal. After heating the adhesive which is coated on the inner surface of the cover plate, the fingerprint chip is laminated on the adhesive, such that the adhesive fully contacts the cover plate and the fingerprint chip. Therefore, the fingerprint chip is tightly combined with and is difficult detached from the cover plate, and a quality of the fingerprint module is improved.

The present disclosure has been described with a preferred embodiment thereof and it is understood that many changes and modifications to the described embodiment can be carried out without departing from the scope and the spirit of the disclosure that is intended to be limited only by the appended claims.

What is claimed is:

1. A fingerprint module, comprising:
a cover plate comprising an inner surface;
an adhesive;
a fingerprint chip heat-pressed on the inner surface by the adhesive, the adhesive contacting the cover plate and the fingerprint chip; and
a circuit board attached to and electrically coupled to the fingerprint chip by solders, a conductive adhesive, or a board-to-board connector sandwiched therebetween,
wherein the fingerprint chip comprises an identifying surface facing the cover plate and a connecting surface facing the circuit board, and solder pads are disposed on the connecting surface, the solder pads are electrically coupled with the circuit board in a direction perpendicular to the connecting surface.

2. The fingerprint module according to claim 1, wherein the circuit board is coupled to the connecting surface of the fingerprint chip opposite to the cover plate.

3. The fingerprint module according to claim 1, wherein the fingerprint chip comprises an encapsulation layer, a chip, and a substrate, the chip is fixed onto the substrate, and the encapsulation layer is laminated on the substrate and covered with the chip.

4. The fingerprint module according to claim 3, wherein the identifying surface is disposed on the encapsulation layer and the connecting surface is disposed on the substrate.

5. The fingerprint module according to claim 4, wherein the circuit board is heat-pressed on the connecting surface by the conductive adhesive to allow the solder pads to be electrically coupled with the circuit board in the direction perpendicular to the connecting surface.

6. The fingerprint module according to claim 4, wherein the circuit board is soldered to the solder pads of the fingerprint chip by the solder to allow the solder pads to be electrically coupled with the circuit board.

7. The fingerprint module according to claim 4, wherein the fingerprint chip is electrically coupled with the circuit board, the board-to-board connector comprises a plug soldered onto the circuit board and a socket soldered onto the connecting surface of the fingerprint chip and electrically coupled to the solder pad.

8. The fingerprint module according to claim 1, wherein the cover plate further comprises an outer surface opposite to the inner surface and configured to contact with a fingerprint of a user; and a groove is formed in the inner surface, and the fingerprint chip is located in the groove of the inner surface.

9. The fingerprint module according to claim 1, wherein the cover plate further comprises an outer surface opposite to the inner surface and configured to contact with a fingerprint of a user; and a groove is formed in the outer surface, and the fingerprint chip is located at a location of the inner surface corresponding to the groove of the outer surface.

10. A method for fabricating a fingerprint module, comprising:
providing a cover plate having an inner surface;
coating adhesive on the inner surface and heating the adhesive;
laminating a fingerprint chip on the adhesive; and
attaching and electrically coupling the fingerprint chip to a circuit board by solders, a conductive adhesive, or a board-to-board connector sandwiched therebetween,
wherein the fingerprint chip comprises an identifying surface facing the cover plate and a connecting surface facing the circuit board, and solder pads are disposed on the connecting surface, the solder pads are electrically coupled with the circuit board in a direction perpendicular to the connecting surface.

11. The method for fabricating the fingerprint module according to claim 10, wherein the circuit board is coupled to the connecting surface of the fingerprint chip opposite to the cover plate.

12. The method for fabricating the fingerprint module according to claim 11, wherein the conductive adhesive is coated on the connecting surface of the fingerprint chip opposite to the cover plate prior to providing the circuit board; and the circuit board is laminated on the conductive adhesive during providing the circuit board.

13. The method for fabricating the fingerprint module according to claim 12, wherein the circuit board is a flexible circuit board.

14. The method for fabricating the fingerprint module according to claim 10, wherein the cover plate further comprises an outer surface opposite to the inner surface and is configured to contact with a fingerprint of a user; and a groove is formed in the inner surface or in the outer surface, and the fingerprint chip is located in the groove of the inner surface.

15. A mobile terminal, comprising:
a cover plate comprising an inner surface;
a fingerprint chip being heat-pressed on the inner surface by adhesive, the adhesive contacting the cover plate and the fingerprint chip; and
a circuit board attached to and electrically coupled to the fingerprint chip by solders, a conductive adhesive, or a board-to-board connector sandwiched therebetween,
wherein the fingerprint chip comprises an identifying surface facing the cover plate and a connecting surface facing the circuit board, and solder pads are disposed on the connecting surface, the solder pads are electrically coupled with the circuit board in a direction perpendicular to the connecting surface.

16. The mobile terminal according to claim 15, wherein the circuit board is coupled to the connecting surface of the fingerprint chip opposite to the cover plate.

17. The mobile terminal according to claim 15, wherein the circuit board is a flexible circuit board or a printed circuit board.

* * * * *